United States Patent [19]

Van Nimwegen

[11] 4,230,292
[45] Oct. 28, 1980

[54] PROPULSION/CONTROL FOR VTOL VEHICLE

[75] Inventor: Robert R. Van Nimwegen, Phoenix, Ariz.

[73] Assignee: The Garrett Corporation, Los Angeles, Calif.

[21] Appl. No.: 914,248

[22] Filed: Jun. 9, 1978

[51] Int. Cl.$^2$ .............................................. B64C 15/06
[52] U.S. Cl. ............................ 244/23 D; 244/53 B; 244/73 R
[58] Field of Search .................. 244/12.3, 12.5, 23 R, 244/23 A, 23 B, 23 C, 23 D, 52, 53 B, 73 R

[56] References Cited

U.S. PATENT DOCUMENTS

| | | | |
|---|---|---|---|
| 2,077,471 | 4/1937 | Fink | 244/12.3 |
| 2,918,230 | 12/1959 | Lippisch | 244/23 B |
| 2,973,921 | 3/1961 | Price | 244/23 D |
| 3,174,707 | 3/1965 | Ricard | 244/12.5 |
| 3,388,878 | 6/1968 | Peterson et al. | 244/23 B |
| 3,912,201 | 10/1975 | Bradbury | 244/23 D |
| 4,004,760 | 1/1977 | Ando et al. | 244/53 B |

*Primary Examiner*—Charles E. Frankfort
*Attorney, Agent, or Firm*—James W. McFarland; Albert J. Miller; Herschel C. Omohundro

[57] ABSTRACT

A propulsion/control system for aircraft of the vertical takeoff and landing type having a body without wings or tail and relying entirely on fluid streams for effecting liftoff, propulsion, and control. The body has an air duct with an inlet adjacent the rear end and a downwardly directed outlet at each side, an engine driven fan being disposed in the duct at the inlet and a cascade of adjustable vanes at each outlet. Operation of the fan causes air to flow into the inlet, through the duct, and issue in streams from the outlets, the reaction of such streams imparting lifting and flight forces to the body. By adjusting the cascades of vanes, the effects of the forces can be varied to control the movement of the body. To further control the movement and stability of the body in the air, additional adjustable elements may be provided. For example, trim doors may be disposed in the air duct immediately in advance of the cascades of vanes, adjustment of the doors shifting the air streams flowing to and through the outlets relative the center of gravity of the body. In this manner better balance can be secured and shifts of the center of gravity, due to changes in loading or other causes, can be compensated. It may be found desirable also, to apply adjustable roll control vane elements to the body adjacent the sides of the outlets to partially oppose the streams of air flowing to and from the outlets to vary the reactionary forces. A shield is applied to the rear end of the body to confine inlet airflow to a predetermined path.

11 Claims, 8 Drawing Figures

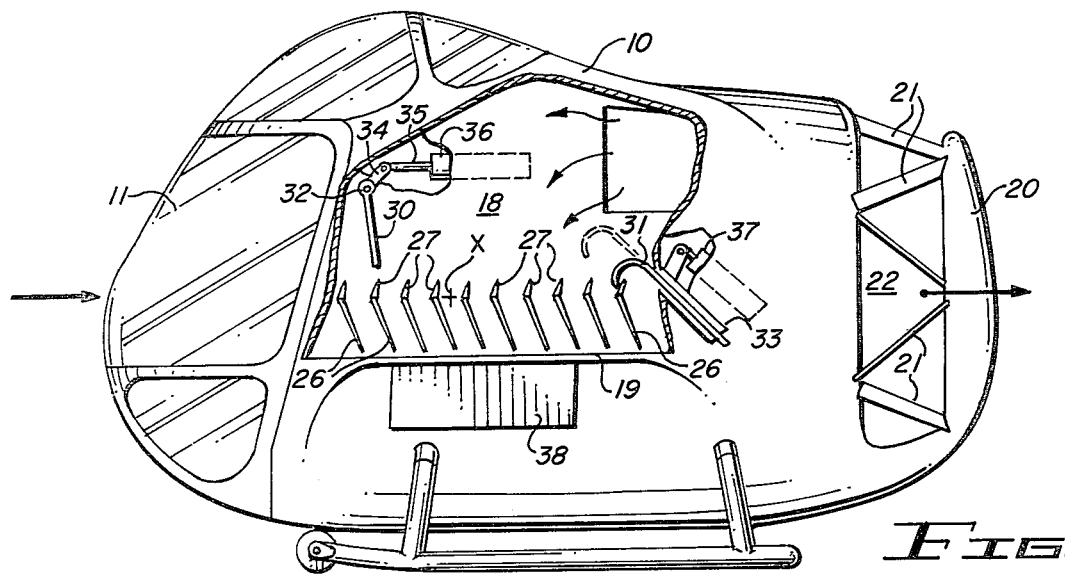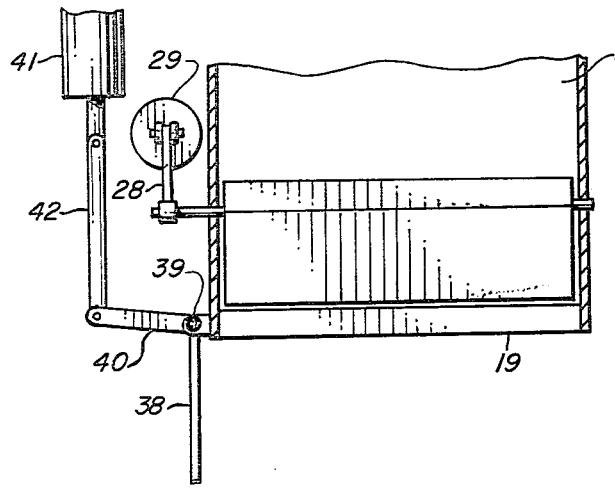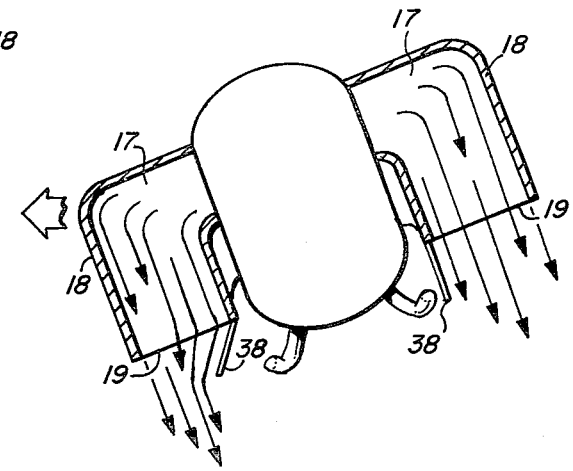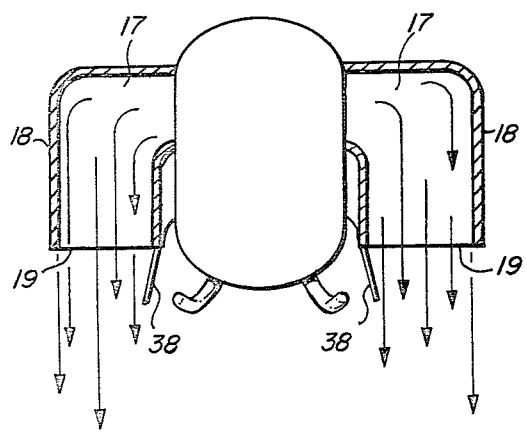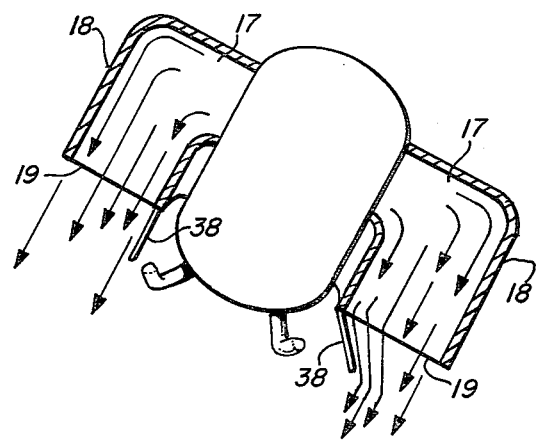

4,230,292

PROPULSION/CONTROL FOR VTOL VEHICLE

BACKGROUND OF THE INVENTION

This invention relates generally to aircraft and more particularly to aircraft of the vertical takeoff and landing type. The invention may be generally classified with aircraft exemplified by the types shown in the following patents.

| #3,073,548 | Marsh | January 15, 1963 |
| #3,140,841 | Marchant et al | July 14, 1964 |
| #3,153,906 | Marchant | October 27, 1964 |
| #3,174,709 | Alderson | March 23, 1965 |
| #3,209,535 | Marchant et al | October 5, 1965 |
| #3,258,206 | Simonson | June 28, 1966 |
| #3,486,716 | Haberkorn et al | December 30, 1969 |
| #3,863,869 | Bachman | February 4, 1975 |

While more of the listed patents relate to or show vertical takeoff aircraft, many of them are of the winged type and therefore have control problems and structure for solving the same which differ from those of the present invention.

The invention herein is more particularly directed to aircraft which is devoid of wings which provide lift and a boom or tail which provides stabilizing characteristics, the craft herein relying entirely upon fluid streams to effect lift, propulsion, and control.

Vertical takeoff and landing aircraft are difficult to control in a lover mode of flight because of the limited availability of control energy. Some prior systems have utilized engine bleed air which is ducted to puffer jets in the wing tips resulting in a significant penalty to takeoff power. Some forms of wingless vehicles, ie, small platforms, have depended upon vehicle attitude to develop thrust by vectoring the jet for forward flight, however, to reach suitable forward speeds the tilted attitudes become excessive. All systems require a precise control of the thrust forces relative to the center of gravity to maintain stability since control moments of low inertia vehicles are not sufficient to react the unbalance moments generated by normal center of gravity travel.

Vertical takeoff and landing aircraft of the wingless and and tailless type have inherent control instability problems which require automatic stabilization or excessive pilot effort to maintain control of the aircraft during the transition to forward flight. Ordinarily, in forward flight, a rudder, horizontal stabilizer, or tail rotor is required for directional stability.

One of the objects of this invention is to provide an aircraft of the vertical takeoff and landing (VTOL) type and which is also wingless and devoid of a boom or tail, the aircraft having an engine driven fan and structure to provide fluid streams so directed as to elevate the craft, propel it through the air, and control its direction, stability, and attitude.

Another object of the invention is to provide a VTOL aircraft having a body with an air duct with an inlet and a pair of outlets, one at each side of the body and directed downwardly, an engine driven fan being disposed in the air duct adjacent the inlet and operative to cause air to flow into the duct and be discharged from the outlets, the reactions of the streams tending to urge the body upwardly, cascades of vanes being adjustably arranged in the outlets and operative to direct the streams of air discharged from the outlets angularly relative to the vertical axis of the body to impart forward thrust thereto or rearward thrust to counteract forward movement and interrupt the same.

A further object of the invention is to provide the body of the vehicle mentioned in the preceding paragraph with adjustable door means in the air duct in advance of the outlets and serving to shift the effective areas of the outlets fore and aft to vary the relative positions of the streams issuing from the outlets to the vehicle center of gravity whereby the attitude of the craft might be controlled.

A still further object of the invention is to provide such craft with adjustable vanes exterior of the body and at one side of each outlet to partially restrict the airstreams to further exercise control of the body.

An object also is to dispose the inlet of the air duct adjacent the rear of the body and to position a shield or similar member in spaced relation from the rear of the body so that air may flow laterally into the space between the body and shield and be drawn into the inlet of the duct by the fan, this arrangement providing a momentum drag aft of the vehicle center of gravity which introduces an inherent directional stability for both pitch and yaw of the vehicle. Since the drag is proportional to vehicle velocity for a constant fan flow it is an effective stabilizer from very low forward velocities to maximum operating speeds.

Other objects and advantages will be apparent from the following description of one form of the invention which has been shown in detail in the accompanying drawings.

IN THE DRAWINGS

FIG. 2 is a side elevational view of the aircraft shown in FIG. 1 with parts in section to show hidden structure;

FIG. 3 is a vertical transverse sectional view taken through one of the outlets of the air duct to show features of construction and operation;

Figure 1:
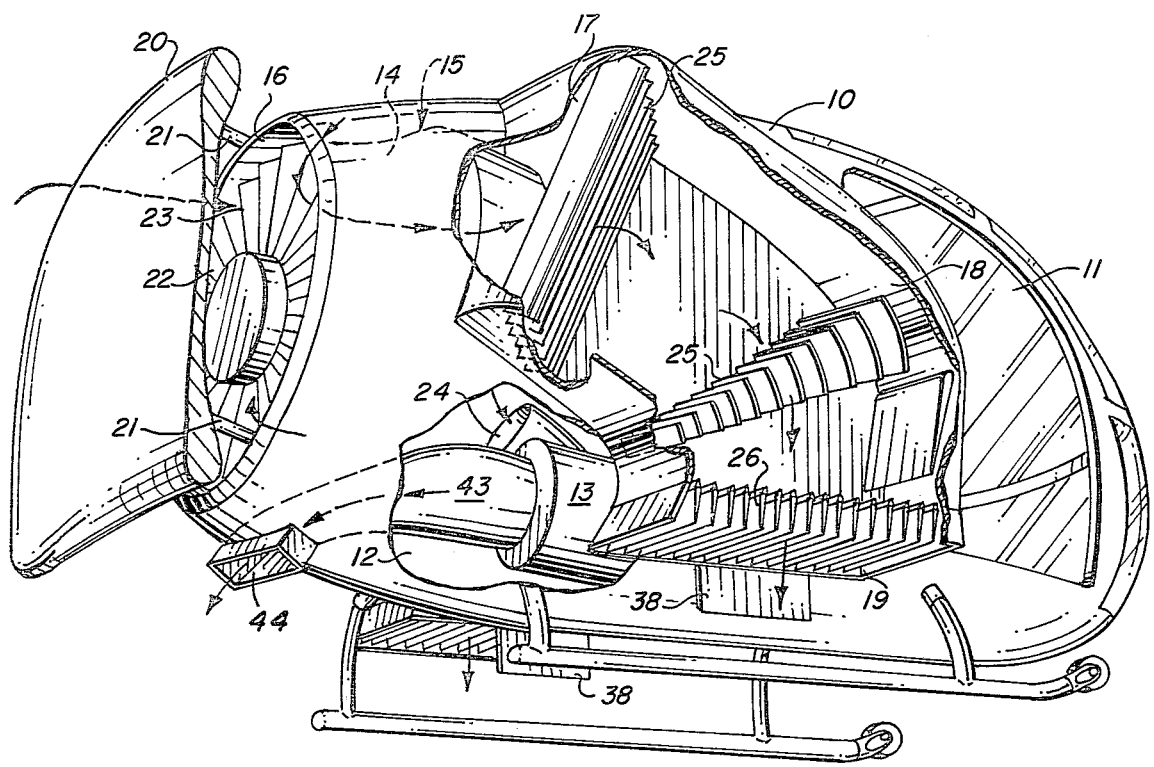
FIG. 1 is a schematic perspective view of a VTOL aircraft formed in accordance with the present invention.
Figures 7, 8:
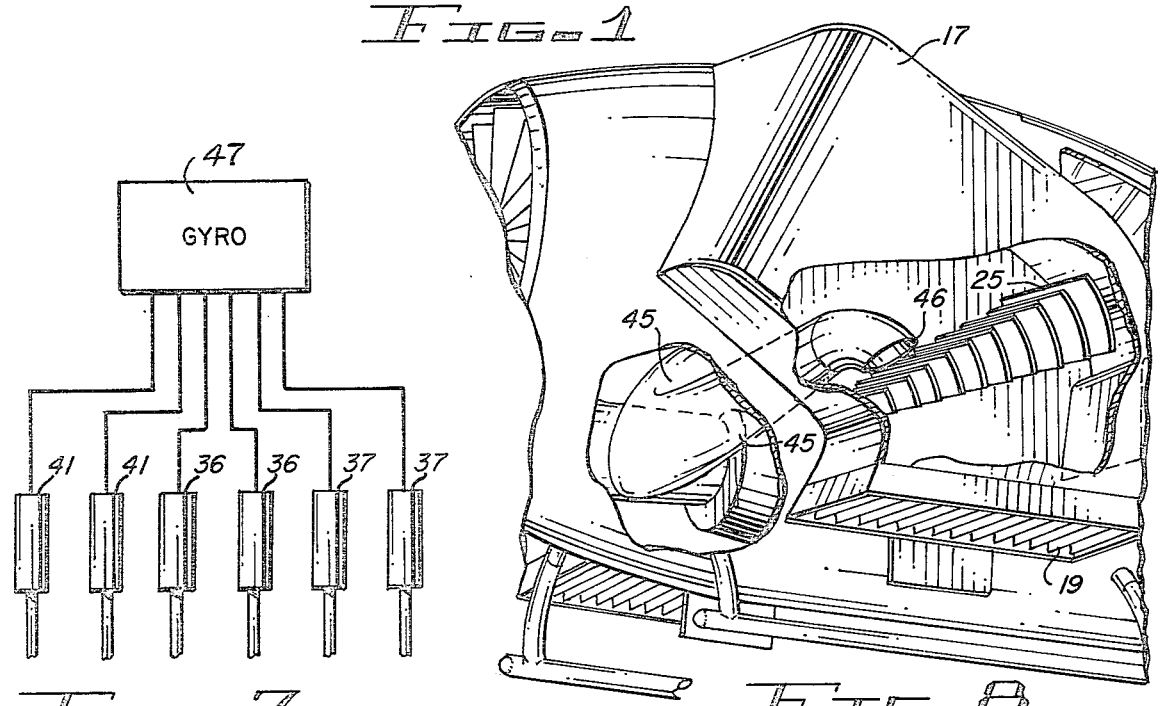

FIGS. 4, 5, and 6 are schematic cross-sectional views illustrating various control modes;

FIG. 7 is a diagrammatic view of part of an automatic control system employed in the aircraft of the invention; and FIG. 8 is a fragmentary perspective view of the craft shown in FIG. 1 with a slight modification.

DESCRIPTION OF THE DISCLOSURE

Particular reference to the drawings shows that the aircraft of the invention has a body 10 which includes a fowardly disposed passenger compartment 11, an intermediate compartment 12 for an engine 13 which in the embodiment illustrated is of the gas turbine type, and a rear end compartment 14 containing an air duct designated generally by the numeral 15. In the form of the invention selected for illustration, the air duct has an inlet disposed at the rear end of the body 10. The duct extends forwardly a short distance and divides into two laterally extending branches 17 which slope forwardly and downwardly, as at 18, and terminate in downwardly directed outlets 19. These outlets are substantially rectangular, when viewed in plan, and are preferably arranged to be centered on a vertical plane passing through the center of gravity X (see FIG. 2) of the vehicle. It will be observed from the drawings that the inlet 16 of the air duct faces rearwardly of the body but a shield 20 is supported in spaced relation from the end of the body by struts 21, the space between the shield and the body providing an air entrance space 22.

In the operation of the craft air is caused to enter and flow through the air duct and issue in streams from the outlets 19. To cause such air flow, a fan 23 is rotatably supported in the duct at the inlet 16 and connected for operation, through suitable transmission means with the engine 13, the latter receiving air from the air duct through one or more openings 24 in the duct. It should be obvious that due to the operation of the fan 23 air will flow laterally through the air space 22 and into the air duct inlet 16. It will flow through the duct and branches 17 and outwardly in streams from the outlets 19. The reaction of these streams will impart an upward force to the body and tend to lift it from its supporting surface.

To assist in the distribution of the air in the branches 17, spaced curved guide elements 25 may be provided in the branches at regions where the branches are curved.

The duct branches are also provided, just upstream of the outlets 19, with cascades of guide vanes or deflectors 26, these deflectors extending transversely of the outlets and being mounted at their upper portions for pivotal movement about horizontal axes. These axes are preferably disposed on a horizontal plane containing the fan centerline so that the thrust component is on the same plane as the ram drag to minimize unbalanced moments during forward flight. The vehicle center of gravity X should be located in this plane at the hinge line of deflectors n the same plane as the ram drag to minimize unbalanced moments during forward flight. The vehicle center of gravity X should be located in this plane at the hinge line of deflectors 26 to minimize unstabilizing pitching moments during transition from vertical to horizontal flight. Splitter vanes 27 may be arranged in the duct branches in advance of the pivoted ends of the deflectors 26 to cause a smooth flow of air to the deflectors. It will be obvious that two sets of deflectors are provided, one being disposed in each outlet. Movement of the deflectors 26 may be effected in many ways, a simple manner being selected, for illustration only, herein. In FIG. 3, for example, the pivots for the deflectors have extensions to which arms 28 are connected, these arms in turn being linked to an actuator 29 through the operation of which the deflectors may be swung between angular positions extending forwardly and rearwardly from the vertical. The deflectors serve to control the direction of thrust imparted to the vehicle by streams of air flowing from the outlets 19. It should be obvious that if the deflectors are set to direct the air streams generally rearwardly the reaction to such flow will cause the vehicle to move in a forward direction, some of the force serving also to maintain the vehicle in an elevated state after the latter has been attained by the reaction to the downwardly directed streams.

As previously pointed out, one of the problems encountered with wingless, tailless craft of the type illustrated is to secure and maintain a desirable attitude of such craft. A method selected herein is to change the effective positions of the air outlets on the body and vary the sizes of the outlets to compensate for shifts of the vehicle center of gravity X both longitudinally and laterally due to any cause whatever, such as, a change in the number of vehicle occupants. This result is attained by providing trim doors 30 and 31 in the duct branches 17 immediately upstream of the cascades of deflectors 26 or the splitter vanes 27. Doors 30 are arranged adjacent the front walls of the duct branches and doors 31 are disposed adjacent the rear walls. The former doors may be pivoted as at 32 for movement toward and away from the front duct wall. Doors 31 may be guided by elements 33 for longitudinal movement between extended and retracted positions. It will be seen from FIG. 2 that movement of either or both sets of doors 30, 31 may vary the effective areas, ie sizes, of the outlets and/or the effective positions thereof fore or aft of the vehicle. For example, if trim doors 30 are moved toward the front walls of the duct branches while doors 31 are in retracted positions the outlets may be increased a limited extent in area. If doors 31 are extended while doors 30 are positioned in a forward position the effective location of the air streams flowing from the outlets would be shifted forwardly relative to the vehicle center of gravity. It should be clear that when such a shift is performed the reaction to the fluid streams will tend to tip the vehicle about the center of gravity. If the effective locations of the outlets or the streams flowing therefrom are shifted forwardly relative to the center of gravity the vehicle will tend to tip upwardly. The opposite effect will result if the locations of the outlets are shifted rearwardly. It will be observed that by suitable manipulation of the doors a desired attitude may be attained. It should also be clear that by predetermined adjustments of the effective areas of opposite outlets the vehicle may be caused to roll a limited extent about its longitudinal axis.

Here again, the doors 30 and 31 may be moved in many ways, a simple example being shown herein for illustrative purposes only. Door 30 in each branch may be provided with a lever 34 connected with the pivot thereof and a link 35 employed to transmit power to the lever from a power unit 36. A similar power unit 37 may be employed to effect adjustment of door 31.

As shown in FIG. 3, it may be found desirable to provide the craft with additional exteriorly disposed deflectors 38 to restrict variable portions of the air flowing from the outlets and thus impart a desired reaction to the vehicle. FIGS. 4, 5, and 6 show, schematically, such reactions. In FIG. 4, deflectors 38 are shown in positions to offer only limited restriction to flow from the outlets, the restriction being equal at both outlets. The craft will therefore tend to remain in a normal level position. FIGS. 5 and 6 show selected deflectors 38 at opposite sides of the craft in operative positions which will cause a rolling action in one direction or the other depending upon which deflector is actuated. These deflectors may also be adjusted in many ways. Once again, a simple form of actuation has been shown by way of illustration only. As in FIG. 3, deflector 38 is pivoted, as at 39, and an arm 40 projects from the pivoted deflector and is connected to an actuator 41 by a connecting rod 42. Operation of the actuator 41 will swing the deflector from its retracted position, shown in FIG. 3, to an extended position shown in FIGS. 5 and 6, wherein part of the flow from the particular outlet will be opposed. The effects will be as depicted in FIGS. 5 and 6, ie, a roll couple to the right or left which is required to rotate the vehicle and thereby the thrust vector to produce a horizontal thrust which is required to execute a turn.

Suitable manual controls for the various actuators may be provided to govern the operation of the respective elements and consequently the response of the craft thereto. As previously suggested, excessive pilot effort may be required to maintain control of the aircraft during some modes of flight, it is therefore within the concept of the invention to provide automatic operation of predetermined actuators as the necessity demands. This automatic operation may be secured by introducing a gyro stabilized reference plane with which actuator controls would be coordinated so that the thrust vector would be automatically aligned with the location of the center of gravity X. In FIG. 7 a system for automatically controlling the actuators 36, 37, and 38 for doors 30 and 31, and deflectors 38 in accordance with vehicle attitudes has been schematically illustrated. The system of FIG. 7 includes a gyro equipped mechanism 47 for actuating suitable valve means to control the application of fluid pressure to the various actuators in accordance with changes in vehicle attitudes relative to the reference plane established by the gyro. Through the actuation of the doors 30 and 31 and deflectors 38 stability of the craft in flight will be automatically maintained. The adjustment of the engine power and airflow deflectors 26 will be manually performed to govern lift, flight, and descent of the craft.

In FIG. 1, an exhaust duct 43 from the engine is shown extending to a nozzle 44 projecting from the lower rear end of the body. By making the nozzle 44 adjustable, this arrangement may be employed to utilize the exhaust gases from the engine as a jet to add forward thrust and limited pitching tendencies to the vehicle. As indicated in FIG. 8, it is within the concept of the invention to mix the exhaust gases with the fan air immediately in advance of the outlets 19 to utilize the heat of the gases to improve the efficiency of the vehicle as well as to cool the exhaust gases. In FIG. 8, the modified engine exhaust duct 45 is split to provide branches 46 with outlets 17 of the air duct. The exhaust gases flowing from the outlets 46 may mix with the fan air to heat the latter and cool the exhaust gases thereby eliminating danger to personnel or surroundings due to hot exhaust gases. The heated air flowing from the outlets 19 will have increased effectivity.

From the foregoing description it should be apparent that the present invention uses forces generated by the normal airflow through a ducted fan to stabilize the vehicle and arranges the discharge location to perform the functions of providing required lift, thrust and braking, trim for normal center of gravity travel, and generates required control forces and moments.

The structure shown and described constitutes a means of controlling and stabilizing the vehicle using part of the fan air which is provided for lift and thrust and thus avoids the requirement of external aerodynamic control surfaces.

An advantage of locating the inlet for the ducted fan at the rear of the vehicle is that the entering air executes a 180 degree turn as it enters the fan and the momentum drag thus caused is proportional to the mass flow of air times the vehicle velocity. By locating this drag aft of the vehicle center of gravity it introduces an inherent direction stabilizer for both pitch and yaw and since such drag is proportional to vehicle velocity for a constant fan flow, it is an effective stabilizer at low forward velocities.

To provide for an emergency, such as an engine failure, the vehicle may be equipped with a parachute actuated by a rocket, or other suitable means, to be energized either automatically or manually as the occasion requires.

I claim:

1. In an aircraft of the verical takeoff and landing type having a body, the combination comprising:
    (a) means forming an air duct in said body with an inlet at a predetermined point in the body and downwardly directed outlets at opposit sides of said body;
    (b) an engine in said body;
    (c) a fan in said air duct adjacent said inlet and connected for operation by said engine to cause a flow of air through said duct;
    (d) a cascade of deflector blades in said duct adjacent each of said outlets, said blades being adjustable about axes disposed in a plane coextensive with the axis of rotation of said fan to direct airflow from said outlets at selected angles to the vertical; and
    (e) door means in said air duct in advance of said outlets, said door means being adjustable to change the effective positions of said outlets relative to the center of gravity of said body.

2. The combination set forth in claim 1 in which the inlet of the air duct is disposed adjacent the rear of said body.

3. The combination set forth in claim 2 in which a shield is secured to the rear of said body to direct air laterally into the inlet of said duct.

4. The combination set forth in claim 1 in which the air duct is bifurcated at the downstream side of said fan to form branches leading to said downwardly directed outlets.

5. The combination set forth in claim 1 in which the door means are disposed in said duct upstream of said cascades of deflector blades.

6. The combination set forth in claim 1 in which said door means is disposed in said air duct above the plane containing the axes of adjustment of said deflector blades.

7. The combination set forth in claim 6 in which said door means includes two elements for each outlet, one being disposed at the forward end of the outlet and the other at the rear of the outlet.

8. The combination set forth in claim 1 in which additional deflector means are provided exteriorly of said body adjacent said outlets, said additional deflector means being adjustable to limit varying amounts of air flowing from said outlets and impart predetermined forces to said body.

9. The combination set forth in claim 1 in which nozzle means are provided on said body to direct engine exhaust gases in a selected direction and impart a predetermined reaction to said body.

10. In an aircraft of the vertical takeoff and landing type having a body, the combination comprising:
    (a) means forming an air duct in said body with an inlet at a predetermined location in said body and a downwardly directed outlet at each side of said body;
    (b) an engine in said body;
    (c) a fan in said air duct adjacent said inlet and connected with said engine for operation to cause air to flow through said air duct and issue in streams from said outlets to apply an upward force to said body;
    (d) means in said body operative to adjust said streams forwardly and aft relative to said body; and
    (e) a second means to selectively direct said streams at angles forwardly and rearwardly relative to the vertical to control the attitude and forward motion of said body, said second means including a cascade of deflector blades adjacent each of said outlets, said blades being adjustable about axes disposed in a plane coextinsive with the axis of rotation of said fan.

11. The combination set forth in claim 10 in which said engine is of the gas turbine type with an air inlet communicating with said air duct and means for directing exhaust gases from the engine into the air duct downstream of the engine air inlet to heat the air flowing to said outlets and increase the efficiency of said streams in effecting lift of the body.

* * * * *